United States Patent Office 2,767,054
Patented Oct. 16, 1956

2,767,054

COBALT PENTAMMINE SEPARATION

Felix A. Schaufelberger, Yonkers, and Alfred M. Czikk, Flushing, N. Y., assignors to Chemical Construction Corporation, New York, N. Y., a corporation of Delaware No Drawing. Application December 23, 1953, Serial No. 400,115

4 Claims. (Cl. 23—117)

This invention relates to hydrometallurgy of cobalt and nickel. More particularly it is concerned with the separation of these metals one from the other when both are contained in the same liquor. Still more particularly, it involves a new method of obtaining a substantially nickel-free cobalt solution from liquors containing the mixed soluble salts of both metals.

Nickel and cobalt metals and their naturally-occurring minerals are very similar to one another in both physical and chemical properties. Moreover both metals generally occur together in their natural deposits and cannot be separated by conventional ore dressing methods. For these reasons, both metals are generally present, in varying amounts, in solutions that result from any type of leaching of either nickel or cobalt natural or intermediate products.

In conventional metallurgy of either nickel or cobalt, the presence of relatively large quantities of the minor metal in the ores and concentrates of the major one has always been a serious and difficult problem. When small amounts of cobalt are present in nickel concentrates, most of that cobalt is discarded in the slag from nickel smelting. The remainder is sold in the nickel bullion or cathodes as nickel metal. Very little is recovered and sold as cobalt metal primarily because the cost of separation by present methods is at least as great as the additional value of the cobalt metal.

When small amounts of nickel are present in cobalt concentrates and therefore in the cobalt solutions this nickel is generally either discarded at considerable loss or is recovered with the cobalt. In the latter case, the nickel becomes an impurity in the cobalt metal, and the producer is generally not paid for it. In some cases, certain nickel and cobalt mixed metals are marketable as such, but usually at a price below the value of the pure metals in separate products.

It is apparent therefore that a process for the efficient separation of cobalt and nickel into separate products would be very useful in both nickel and cobalt metallurgy.

Many processes have been either proposed or used for the treatment of liquors containing dissolved cobalt and nickel salts. Most of these involve the oxidation of cobalt to cobaltic hydroxide, while the liquor is being partially neutralized with an alkali. Cobalt is easier to oxidize, and the resulting cobaltic salt will hydrolyze and precipitate from a slightly more acidic solution than will the parallel nickel hydroxide.

There have been also suggested several methods of separating nickel and cobalt from ammonium carbonate leach liquors. Most of these involve fractional distillation of the ammonium carbonate. The mother liquor, at different stages in the process, thereby becomes concentrated with either nickel or cobalt. This liquor may then be removed and treated separately. The residue may be redissolved and retreated separately.

The above types of processes for the production of nickel or cobalt result in products containing relatively large amounts of the other metal. This relatively poor separation is probably due to the fact that the separations are made by precipitation of hydroxide or basic carbonate solids. These solids always occlude or absorb large quantities of the solution from which they are precipitated.

More recently there have been several new separation procedures suggested. One such procedure comprises recovering cobalt as cobaltic hexammine sulfate. The procedure comprises adjusting the solids content of the liquor to provide at least sufficient ammonia to form cobalt hexammine and at least sufficient anions to satisfy the cobalt in its trivalent state. The adjusted solution is then oxidized and heated to about 250° F. to precipitate a yellow-orange crystalline cobaltic ammine salt, substantially free of nickel. This procedure provides for an excellent separation and produces a high purity cobalt product particularly when treating liquors having low cobalt to nickel ratios. It, however, is not particularly satisfactory for liquors having high cobalt to nickel ratios since it involves separating the major metal constituent in solid form. In addition it requires high ammonia concentrations to insure formation of the hexammine as well as high temperatures and pressures.

Another recently suggested process for effecting a nickel-cobalt separation comprises high temperature reduction with hydrogen in which nickel in the form of nickel ammine complexes is preferentially reduced with respect to cobalt. This may then be followed by reduction of the cobalt. While products of excellent purity are also obtained in this method it also has the disadvantages that it requires high temperatures and pressures and is preferably applied to liquors having high nickel to cobalt ratios.

Still another of these new procedures comprises treating a nickel cobalt liquor at room temperature with carbon dioxide whereby cobalt carbonate is precipitated. This provides cobalt products of satisfactory purity particularly from liquors having high cobalt to nickel ratios. Cobalt carbonate moreover is easily calcined and reduced to obtain a metal product. However, the problem created by the handling of large volumes of carbon dioxide is a disadvantage.

In copending application Serial No. 400,112 of F. A. Schaufelberger, one of the inventors herein, filed of even date, there is disclosed a very effective method for separating cobalt from nickel. In general it comprises adjusting the ammonia and ammonium sulfate contents of a nickel and cobalt salt liquor and subjecting adjusted liquor to oxidation with a sulfur-free, oxygen-bearing oxidizing gas. The ammonia content of the liquor is adjusted so as to form a complex ammine salt of the dissolved cobalt content which, when the cobalt is in its trivalent state, is stable and soluble under acid conditions. Thus, sufficient ammonia is added, if necessary, to provide about 5 mols of ammonia for each mol of dissolved cobalt plus about 5 mols of ammonia for each mol of dissolved nickel. After oxidation, the hydrogen ion concentration is adjusted to at least that equivalent to a pH of 4 as by the addition of sulfuric acid. This adjustment, however, is not conducted beyond a hydrogen ion concentration equivalent to a 2% sulfuric acid solution. Within this range of hydrogen ion concentrations cobaltic pentammine is quite stable and very soluble. In contrast the nickel pentammine is decidedly unstable and insoluble and precipitates as the nickel ammonium double salt.

By the procedure of the above identified copending application, a substantially pure cobalt solution is obtained. Except under excessive concentrations of ammonium sulfate, however, it is impossible, regardless of the original concentration of nickel in solution, to reduce the dissolved nickel content below about one gram per liter. Accordingly, it may be necessary, particularly where the cobalt to nickel ratio is low, to adjust the ammonium sulfate concentration to further decrease the solubility of nickel ammonium sulfate, thereby effecting a greater nickel from cobalt separation. This adjustment may be made at any of several stages in the process. Regardless of where made, it is possible to reduce the nickel solubility to as little as about 0.2 gram per liter by increasing the ammonium sulfate concentration to about 4.5 mols or more per liter.

While nickel solubility can be greatly reduced in this manner, ammonium sulfate concentration in the residual cobalt liquor is greatly increased. While this generally would be of no particular concern except for recovery of the ammonium sulfate, high ammonium sulfate concentrations are influential in certain procedures for treating cobalt liquors to recover therefrom the cobalt content as metal. This is particularly true when the procedure comprises gas reduction with hydrogen. A high ammonium sulfate content in such a procedure greatly reduces the recovery of cobalt metal powder. It is, therefore, the primary object of this invention to provide a method of further reducing nickel ammonium sulfate solubility in an oxidized liquor as described above without, however, influencing the effectiveness of subsequent treatment for recovery of cobalt from the residual cobalt liquor.

This object has been met by an improvement which is surprisingly effective, but which does not upset the simplicity and/or economy of the over-all process. In general, this novel method of reducing nickel solubility may be quite simply stated. It comprises appropriately controlling the cobaltous ion concentration of the oxidized liquor so as to precipitate a cobalt nickel ammonium triple salt. This improvement quite remarkably eliminates the disadvantages associated with the use of ammonium sulfate. At the same time the presence of cobaltous sulfate reduces nickel solubility to an extent which would require some 10 to 20 times as much ammonium sulfate. Moreover, nickel solubility may be reduced to substantially zero. While the general statement of the invention is quite simple, there are, nevertheless, certain conditions which must be observed to obtain optimum results.

The lowering of nickel solubility effected by the presence of cobaltous ions is due to the unexpected finding that under the particular conditions of precipitation cobalt-nickel-ammonium triple salt is substantially less soluble than nickel ammonium double salt. The greater the amount of cobaltous cobalt in solution, moreover, the lower may the dissolved nickel content be taken since the solubility of the triple salt has been found to decrease as the cobalt to nickel ratio thereof increases. Thus the amount of cobaltous ions in solution may be quite widely varied.

This amount is most easily described in relation to the cobalt to nickel mol ratio of the precipitated salt. At lower ratios, i. e., 1:1 to 1.5–2:1, the residual content of nickel cannot be reduced to as low as may sometimes be desirable. At ratios of about 3:1, the dissolved nickel content can be reduced to as little as 0.1 gram per liter. On the other hand, the solubility of triple salts having cobalt to nickel ratios of about 3.5:1 and higher is not sufficiently less to warrant precipitation thereof. Moreover, subsequent treatment of nickel products having such high cobalt contents as for instance by preferential reduction with hydrogen, creates a recycle problem with respect to the residual cobalt solution. While the cobalt to nickel ratio of the precipitated salt may, therefore, be varied, optimum results are obtained when the nickel to cobalt ratio is from about 2.5–3.5:1 and preferably 3:1.

The presence of the desired concentration of cobaltous ions in the oxidized solution may be provided for in various ways. For instance, it may be accomplished by conducting oxidation of the original liquor so as to incompletely oxidize initially present cobaltous cobalt. Since it is the last gram/liter of nickel in solution that is of concern, however, this procedure is not particularly desirable because it requires the presence of an excessive amount of cobaltous ions to insure reduction of nickel content to the desired extent. This, in turn, greatly reduces the recovery of cobalt in solution.

Alternatively, cobaltous ion concentration may be adjusted after oxidation by the addition of a cobaltous compound. This may, for example, comprise addition of residual cobalt solution resulting from treatment of nickel precipitate. Cobalt may also be added as various compounds other than the sulfate provided they ionize. While the addition of anions other than the sulfate does not appear to adversely influence the separation of the instant process, provided sufficient sulfate ions are otherwise made available, their presence may seriously affect subsequent treatment of the residual cobalt solution. Accordingly, while not necessary, it is definitely preferable when increasing the cobaltous content by the addition of a cobalt compound to restrict the anion to sulfate.

Increase of the cobaltous content by addition of a cobaltous compound may be done at various stages in the process after oxidation. However, if done before any nickel precipitation, the amount of cobaltous compound required will be excessive. This is subject to disadvantages similar to those described above in the discussion of incomplete cobalt oxidation. Since it is nickel solubilities of about one gram/liter, and less, which are of concern, it is preferable to precipitate nickel to the optimum extent under conditions arising from the initial ammonia and ammonium sulfate adjustment as described in the above noted copending application. The cobaltous ion concentration may then be suitably adjusted to reduce nickel solubility to the desired extent. In this way not only are the disadvantages of excessive cobaltous ion concentration avoided, but two nickel products may be taken, the first of which is substantially cobalt-free nickel ammonium sulfate.

The process of this invention may also be conveniently combined with reduction of nickel solubility by increasing the ammonium sulfate concentration. By proper adjustment of the two, it is possible to reduce nickel solubility as effectively as with either alone. At the same time, ammonium sulfate content of the residual solution and the Co/Ni ratio of the nickel precipitate are lower than could be obtained by adjusting separately the ammonium sulfate and cobaltous ion concentrations respectively.

Attention is directed to copending applications, Serial Nos. 400,113 and 400,114, filed of even date by the same applicants. These applications show methods of improving the separation of the process of above noted application, Serial No. 400,112, which comprise boiling and steam stripping, respectively, of the oxidized solution. The process of this invention may be conveniently combined with either or both of these methods.

The following example will further illustrate the invention:

EXAMPLE

A leach liquor containing 1.08 mols/liter of cobalt sulfate and 0.05 mol/liter of nickel sulfate is adjusted to contain 1.08 mols/liter of ammonium sulfate and 5.4 mols/liter of ammonia and oxidized at room temperature with 50 p. s. i. g. for 15 minutes, then gradually heated over one hour to boiling and steam boiled for 10 minutes. Resultant solution is acidified with 50% sulfuric acid to pH 2, agitated for about one hour, and precipitate separated. Residual cobaltic-pentammine solution containing 1.75 grams/liter of nickel is divided into four equal parts and cobaltous content adjusted by adding cobalt ammonium sulfate in amounts of 0 gm./l., 6.2 gm./l., 9.2 gm./l., and 12.3 gm./l. Results obtained after crystallization are indicated in the table.

Table

| Sample | Added Co(NH$_4$)$_2$SO$_4$ (g./l.) | FILTRATE | | | RESIDUE | | |
|---|---|---|---|---|---|---|---|
| | | Co (g./l.) | Ni (g./l.) | Co/Ni | Co (percent) | Ni (percent) | Co/Ni |
| 1 | 0 | 54.3 | 1.17 | 47 | 6.2 | 8.5 | 0.73 |
| 2 | 6.2 | 58.4 | 0.6 | 96 | 8.1 | 5.3 | 1.54 |
| 3 | 9.2 | 60.6 | 0.4 | 155 | 8.6 | 4.5 | 1.90 |
| 4 | 12.3 | 60.6 | 0.3 | 202 | 11.0 | 3.5 | 3.14 |

We claim:

1. In a hydrometallurgical process for recovering a substantially nickel-free cobalt solution from a liquor containing dissolved nickel and cobalt which comprises adjusting the solutes content of said liquor to provide about 5 mols of ammonia for each mol of dissolved cobalt plus about 5 mols of ammonia for each mol of dissolved nickel and a sulfate ion concentration at least sufficient to satisfy the dissolved cobalt content in its trivalent state and dissolved nickel in its bivalent state; oxidizing the adjusted liquor with a sulfur-free, oxygen-bearing oxidizing gas; introducing sulfuric acid into said oxidized liquor to produce a hydrogen ion concentration at least equivalent to a pH of about 4, whereby a substantially cobalt-free, nickel-bearing precipitate is formed; and separating said precipitate, leaving a solution containing cobalt as acid soluble, acid stable cobaltic ammine sulfate and a minor amount of nickel in its bivalent state, there being insufficient dissolved bivalent cobalt to form a cobaltous-bearing precipitate, the improved method adapted to decrease the nickel content of said solution which comprises: increasing the cobaltous ion content of said solution sufficient to provide a cobaltous ion to nickelous ion ratio of at least about 1:1 whereby cobaltous-nickelous-ammonium sulfate is precipitated, and separating said precipitate.

2. A method according to claim 1 in which the increase in cobaltous ion content is sufficient to provide a cobaltous ion to nickelous ion ratio of about 2.5–3.5:1.

3. A method according to claim 1 in which the increase in cobaltous ion content is sufficient to decrease the dissolved nickel content to less than 1.0 gram per liter, said decrease being conducted without substantially increasing the ammonium sulfate concentration of said solution.

4. A method according to claim 1 in which the cobaltous content is increased by adding a cobaltous compound.

References Cited in the file of this patent

UNITED STATES PATENTS

| 2,531,336 | Hills et al. | Nov. 21, 1950 |
| 2,576,314 | Forward | Nov. 27, 1951 |
| 2,588,265 | McGauley | Mar. 4, 1952 |
| 2,647,820 | Forward | Aug. 4, 1953 |
| 2,647,827 | McGauley | Aug. 4, 1953 |
| 2,647,828 | McGauley | Aug. 4, 1953 |

OTHER REFERENCES

Mellor: "Comprehensive Treatise on Inorganic and Theoretical Chemistry," vol. 14, 1935, published by Longmans, Green and Co., New York, pages 440, 441 and 444.

Mellor: "Comprehensive Treatise on Inorganic and Theoretical Chemistry," vol. 15, 1936, pages 477 and 478.

Vohl: article on Ann. Chem. Justus Liebigs 94, pages 57 to 79, inclusive (1855).